Dec. 26, 1939.  C. J. CONN  2,184,990
METHOD AND APPARATUS FOR QUICK FREEZING OF FOOD PRODUCTS
Filed March 18, 1937

INVENTOR.
Chester J. Conn
BY
his    ATTORNEY.

Patented Dec. 26, 1939

2,184,990

UNITED STATES PATENT OFFICE 2,184,990

METHOD AND APPARATUS FOR QUICK FREEZING OF FOOD PRODUCTS

Chester J. Conn, Smithtown Branch, N. Y.

Application March 18, 1937, Serial No. 131,554

3 Claims. (Cl. 62—104)

This invention relates to improvements in methods of and apparatus for quick freezing of food products, being particularly directed to nozzle formations for discharging spray refrigerant.

Broadly, it is an object of this invention to provide for a novel nozzle formation, whereby brine refrigerant delivered at water-main pressure may be discharged through directional control to act upon the products being frozen with a maximum of surface contact and a minimum of spray velocity.

Specifically, it is an object of this invention to provide in an apparatus for quick freezing food products for a nozzle formation incorporating a deflector assembly, whereby refrigerating fluid discharged at the nozzle orifice and at an angle to the horizontal, may be controlled as to direction and velocity through contact at a point distant from the nozzle orifice with a flat zone merging into a radially extended corrugated zone.

These and other advantages, capabilities and features of the invention will appear from the subjoined detailed description of one specific embodiment thereof illustrated in the accompanying drawing, in which—

Figure 1:
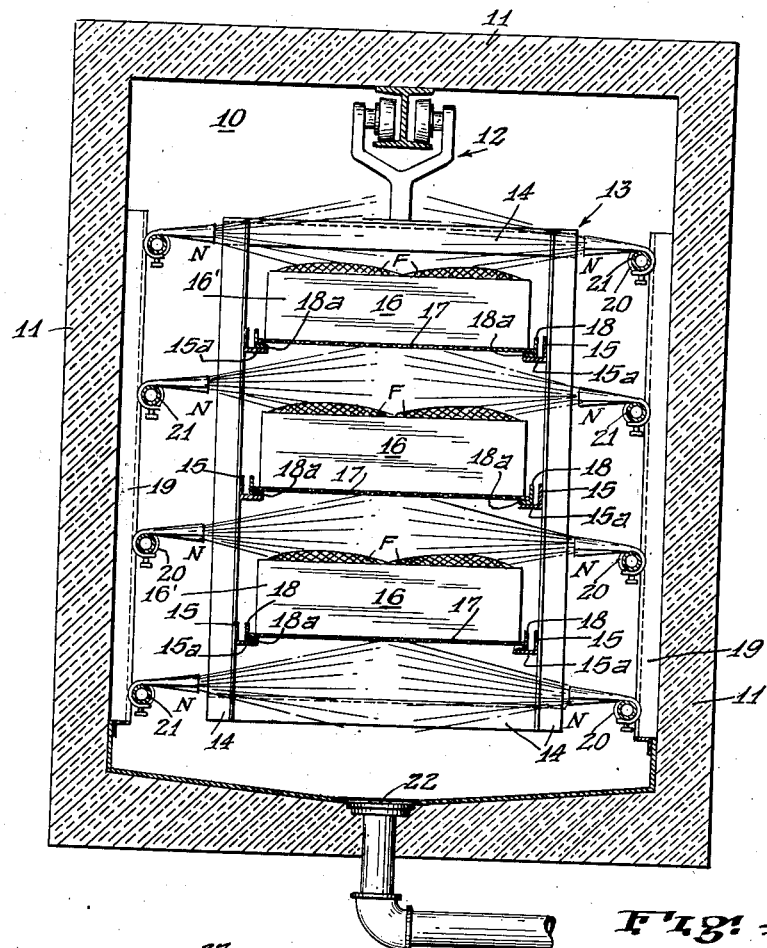
Figure 1 is an end elevation partly in section of a freezing chamber incorporating my invention.

Referring to the reference characters in the drawing, numeral 10 represents a chamber or tunnel having the usual insulated wall formation 11 and in which the carrier 12 is conveyed longitudinally as by mono-rail assembly 13.

As indicated in Figure 1 of the drawing, the carrier 12 comprises of a framework incorporating angle bar members 14 forming top, bottom, side and end members riveted or welded together to form a rigid assembly. Interiorly of the side members there are oppositely disposed spaced wall brackets 15 of angle bar formations.

Upon the opposing horizontal legs 15a of the brackets 15 are adapted to be disposed freezing frames 16 carrying food products F, comprising an open ended box construction having vertical walls 16' and a removable base comprising of a pervious or mesh member 17, on the periphery of which is mounted an angle bar 18, the horizontal leg 18a of which is adapted to serve as a bearing contact with the horizontal leg 15a of the wall support, so as to permit ready insertion and removal of the freezing frame into the carrier.

Along the opposing side walls 11 of the chamber or tunnel there are provided angle bar supports 19 carrying brackets 20 for supporting a series of horizontally extending conduits 21 disposed in spaced vertical relationship along such wall, such conduits being adapted to lead from a common header (not shown) for delivering refrigerating fluid into the chamber.

On the conduits and in spaced horizontal relationship are formed a series of nozzle assemblies N, of which further description in detail will be given.

The base of the chamber or tunnel is sloped and has outlet 22 for discharge of used refrigerant into a system for recovery and re-circulation thereof.

Figure 4:
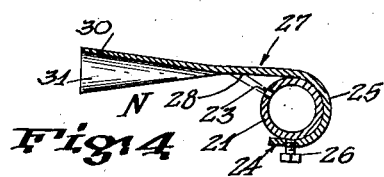
Figure 4 is an end elevation in section of the nozzle formation taken along lines 4—4 of Figure 2.
Figure 2:
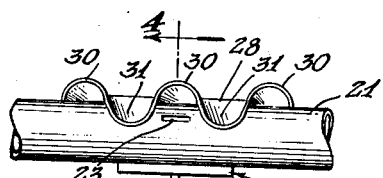
Figure 2 is a front view of the nozzle formation.
Figure 3:
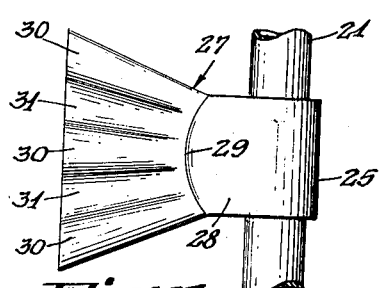
Figure 3 is a plan view of the nozzle formation.

As shown in Figures 2, 3 and 4, the nozzle assembly N comprises of a rectangular orifice 23 in the nature of a slit, disposed at an angle with respect to the horizontal central plane of the conduit. Adjacent the orifice 23 there is mounted a deflection assembly 24 comprising a J-shaped formation, incorporating a base 25 substantially semi-circular in formation and being mounted on the conduit in spaced horizontal relationship to one another as by set screw 26; the deflection portion 27 of the assembly 24 extending forwardly and substantially horizontally with respect to the conduit. The deflection portion 27 comprises of a substantially flat portion 28, the limits of which are defined by arc 29, the remainder of such deflecting surface comprising of a series of ridges 30 and grooves 31 extending from arc 29 and being radially directed and of increasing depth towards the outer periphery.

As shown in Figure 4, refrigerant passing through conduit 21 at normal main pressure of 20 lbs. and discharged through orifice 23 strikes the deflector at the flat zone 28 and is then caused to be deflected laterally and angularly, a considerable portion of the refrigerant being directed into the radially formed ridges 30 and grooves 31, so as to provide for a laterally and vertically controlled distribution of the deflected refrigerant into and across the space between respectively the tops and bottoms of the frames in carrier 12, and thus providing for complete contact with the exposed surface of the food products F.

It is obvious that various changes and modifications may be made to the details of construction without departing from the general spirit of the invention as set forth in the appended claims.

I claim:

1. A method of handling food products, comprising packing the foods in open top and bottom frames, disposing said frames in vertical spaced relationship with respect to one another and discharging spray refrigerant laterally across and in the zone between the frames only, whereby said spray refrigerant contacts substantially only the surfaces of the food products exposed at the open tops and bottoms of the respective frames.

2. A method of handling food products, comprising packing the food products in open top and bottom frames, disposing said frames in vertical spaced relationship with respect to one another and discharging a spray refrigerant in the direction of the framed food products and deflecting the discharged refrigerant laterally and vertically into the zone between the open ends of adjacent frames only, whereby substantially only the exposed surfaces of the food products in adjacent frames are contacted by said deflected refrigerant.

3. In a quick freezing apparatus, in combination with means for supporting food products in vertical spaced layers, an assembly for discharging a refrigerant spray between the respective layers, comprising conduits adjacent the peripheries of and in planes between the supporting means having spaced orifices along the length thereof and deflector members disposed adjacent said orifices for directing refrigerant spray substantially only into the zones between the layers and against the exposed surfaces of the food products.

CHESTER J. CONN.